Sept. 29, 1925.  
W. F. HAMILTON  
KNIFE GUARD FOR CORN HEADERS  
Filed Dec. 11, 1923
1,555,368
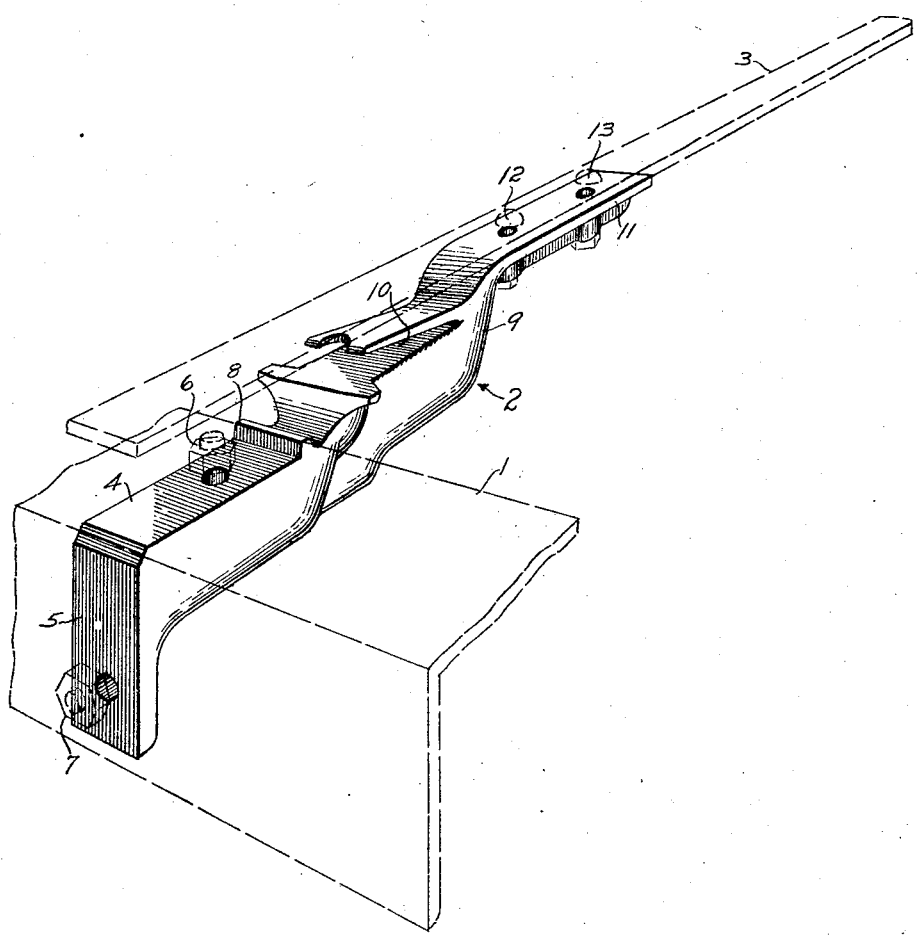
INVENTOR.  
William Francis Hamilton  
BY  
ATTORNEYS.

Patented Sept. 29, 1925.

1,555,368

UNITED STATES PATENT OFFICE.

WILLIAM FRANCIS HAMILTON, OF VENTURA, CALIFORNIA.

KNIFE GUARD FOR CORN HEADERS.

Application filed December 11, 1923. Serial No. 679,933.

*To all whom it may concern:*

Be it known that I, WILLIAM FRANCIS HAMILTON, a citizen of the United States, and resident of Ventura, in the county of Ventura and State of California, have invented new and useful Improvements in a Knife Guard for Corn Headers, of which the following is a specification.

This invention relates to a guard for reciprocating sickles used in cutting kafir corn and like plants, wherein it is desirable to carry the cut heads back over the cutting knife.

In machines of this character, the heads and stalks are relatively large, and, in order to avoid jamming of the stalks in the spaces between the fingers of the guards, a way open at the rear for the passage of stalks between the fingers is provided. The type of machine for which the guard shown herein is designed, employs a comb or grating comprising horizontal relatively long forwardly extending bars or fingers to support heads of corn folded or bent upon the grating. These bars are secured to and act as extensions of the guard fingers. The primary object of this invention is to provide a guard to which a grating bar may be secured in a manner such as to serve the requirements above mentioned. It is a further object of this invention to provide a simple, strong, easily assembled structure, which is efficient and economical.

These objects together with other objects and corresponding accomplishments are obtained by means of the embodiment of my invention illustrated in the accompanying drawing, in which the figure shows a perspective view of a knife guard in full lines, a grating bar secured thereto shown in dotted lines, and an angle bar of the machine frame, to which the guard may be connected.

Referring more particularly to the drawing, an angle bar of the frame is indicated by 1. Secured thereto is a knife guard indicated generally by 2. In the complete machine there are a series of guards mounted along side of one another upon the angle bar, so that when completely assembled there are a group of forwardly extending parallel fingers. Secured to the guard at its nose is a grating bar 3.

Referring to the details of structure of the guard, it comprises a base having a heel 4 to abut the horizontal leg of the angle bar and a toe 5 to abut the vertical leg of the angle bar. The base is placed in the inner angle of the angle bar and may be secured thereto by bolts 6 and 7 extending through registering openings of the angle bar and base. At the forward end of the base is a shoulder 8 for abutting the forward edge of the angle. Extending forwardly from the base is the body of the guard indicated by 9 having a way 10 to receive the knife blade. This way is offset from the base so as to be raised. Offset from the way so as to be disposed above it and at the front of the guard is a nose 11. This nose has a horizontal flat upper surface with bolt holes therein.

Placed upon the nose of the guard and secured thereto by bolts 12 and 13 is the grating bar 3. It will be noted that the bar 3 extends backwardly over the knife way. The grating bars are spaced apart when the machine is assembled to provide ways open at both front and rear, so that as a stalk is carried toward the knife, the head rests upon the grating, and after the stalk has been cut, there is no interference to movement along the grating to the rear thereof, the way being clear.

What I claim is:

1. A knife guard for sickles comprising a base for securing the guard to the frame of a machine having a heel with an abutting ridge transverse thereof and a toe at right angles to said heel, a forward extension having a knife way stepped above the face of said heel, a nose at the forward end of said extension stepped above said knife way and affording means of attachment for a forwardly projecting bar elevated above the knife way.

2. A knife guard for sickles comprising a base for securing the guard to the frame of a machine comprising a heel with an abutting ridge transverse thereof and a toe at right angles to said heel, a forward extension having a knife way, a nose at the forward end of said extension and affording means of attachment for a bar, and a forwardly projecting bar attached to said nose extending rearwardly above and beyond the knife way and spaced from said heel.

In witness that I claim the foregoing I have hereunto subscribed my name this 19th day of January, 1923.

WILLIAM FRANCIS HAMILTON.